Dec. 16, 1947.  R. DOW  2,432,866
SAW HOLDER
Filed April 7, 1944
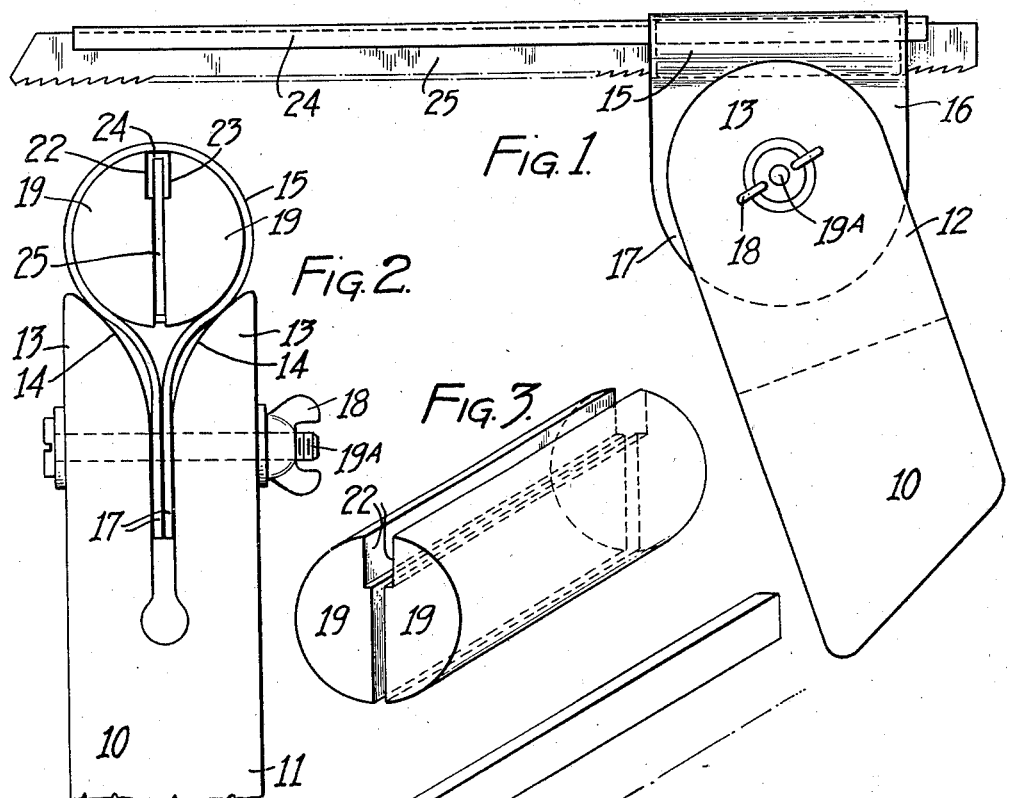
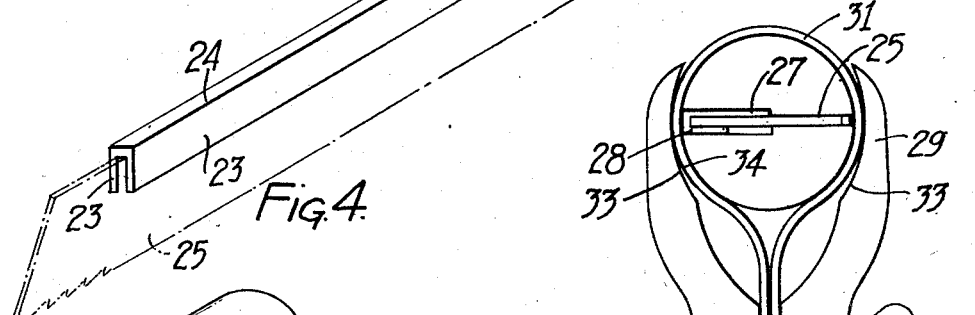
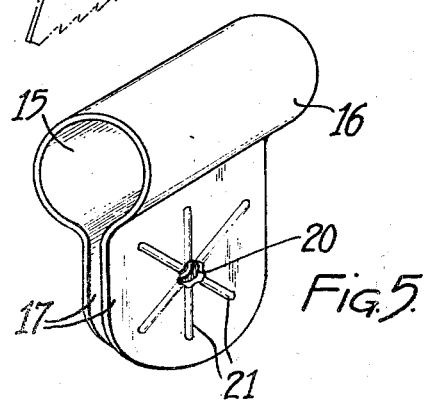
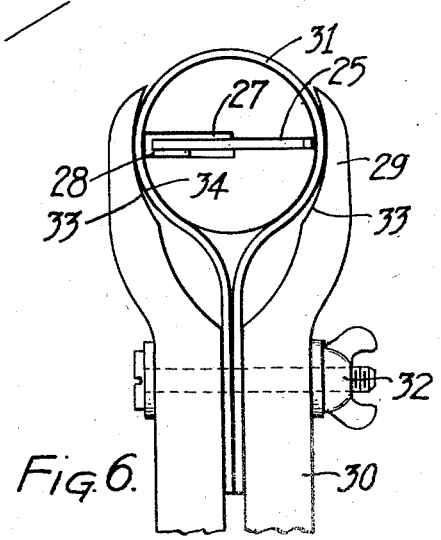
INVENTOR.
RAYMOND DOW Patented Dec. 16, 1947

2,432,866

UNITED STATES PATENT OFFICE 2,432,866

SAW HOLDER

Raymond Dow, Flushing, N. Y.

Application April 7, 1944, Serial No. 529,928

5 Claims. (Cl. 145—108)

This invention relates to saws and in particular to a saw construction of simple form and one that lends itself to universal use, the structure being applicable particularly to hack saws.

A particular object of the invention is to provide a handle and saw holder gripping means that permits the blade to be inserted quickly and adjusted to any angle in rotary direction, the handle and gripping feature permitting the angular disposition of the saw blade at any horizontal angle desired. Further objects of the invention provide for the use of a blade stiffener which, with the blade may be securely gripped in the handle and may hold the blade rigid in either straight or curved shape to do work that might require the use of a curved blade. The parts of the device are of simple construction and lend themselves to rapid adjustment, quick dismantling for replacement and universal adjustment. The saw holder is sturdy in construction and may be used to hold any type saw blade desired, so that metal saws or wood saws can be interchangeably employed.

With these and other objects in view, the invention comprises certain constructions hereinafter described and then particularly pointed out in the claims and a preferred embodiment of my invention is illustrated in the accompanying drawing, in which:

Figure 1 is a view in side elevation of a saw holder and saw combinations constructed in accordance with my invention, Figure 2 is a slightly enlarged view in front elevation, of the saw construction shown in Figure 1, Figure 3 is a view in perspective showing the split clamping barrel employed in retaining the blade in rotatably adjustable position in the handle, Figure 4 is a view in perspective of the saw blade stiffener, the straight form being shown in full lines and the curved form being illustrated in outline, Figure 5 is a view in perspective showing the clamp member into which the split barrel fits, the clamp being held in the handle, and Figure 6 is a view similar to Figure 2 showing a modified form of handle structure in which the clamp is gripped at two places to give rigidity of construction.

Referring to the drawing in detail, 10 indicates a handle made of any suitable material such as wood, metal or plastic consisting of a lower solid body portion 11 and an upper bifurcated section 12 presenting the clamping jaws 13 which are rounded on their upper end and on the inside faces are arcuately shaped as at 14 to engage the sides of the tubular sleeved part 15 of the clamp 16. The space between the jaws 13 permits clamping action of the jaws so that they can grip and hold the depending tabs 17 on the clamp 16. The clamp 16 is of metal and tempered to provide the necessary resilience for securely gripping the split barrel parts 19 which fit into the sleeved portion 15 of said clamp, when the pressure of a wing nut 18 is exerted to draw the jaws 13 toward each other through the bolt 19A which passes through suitable bores in the jaws 13 and through holes 20 in the tabs 17. The latter, if deemed desirable, may be provided with radial ridges 21 for stiffening and adjustment between the jaws 13, as said ridges will be gripped by the inner surfaces of the jaws 13 to hold the clamp in any adjusted position relative to a horizontal plane.

The split barrel parts 19 are each provided with a shouldered recess 22 for supporting the depending flanged edges 23 of a blade stiffener 24 which is closely fitted to the upper edge of the saw blade 25 and holds the latter in straight or curved position depending upon the work to be done. It is understood that different shapes of stiffeners may be employed and slipped on to the saw blade as required when the parts are released from between the split barrel parts 19 by the release of the wing nut. In holding the barrel pieces 19 in the sleeved portion of the clamp, I have found that by also gripping the sides of the sleeved portion 15 with the upper inner arcuate edges of the jaws 13, the tightening of the wing nut not only gives a clamping action in the tab portions of the clamp to effectively hold the barrel pieces tightly gripping the blade and stiffener, but the wedging action of the arcuate edges of the handle will more effectively tighten the clamping sleeve about the barrel pieces and prevent slippage of the blade which might do damage to the individual using the saw.

The shouldered recesses 22 of the barrel pieces 19 may be varied in depth to accommodate a stiffener of the type shown in Figure 6, in which one of the depending flanged edges 27 of the U-shaped blade stiffener 28 is longer than the flange on the opposite side of the blade. In this instance, the upper ends of the bifurcated section 29 of the handle 30, which are drawn into clamping relation with the clamp 31 by the bolt and wing nut combination 32, are provided on the interior surfaces with sleeve seating troughs or hollows 33 which engage the opposite sides of the sleeve 34 that forms the upper portion of clamp 31 and encompasses the barrel parts. This double clamping action secures the blade in the holder and prevents accidental loosening of the parts.

In order to adjust the blade in any rotary direction as shown in Figure 6, the thumb nut is released and the blade revolved with the split barrel to the desired position. The blade can be tilted to any horizontal angle by the same procedure and a combination of rotary and planary adjustment will give a universal adjustment of the blade relatively to the handle, so that work may be done in confined spaces where the position of the handle cannot always be adjusted to properly position the blade for sawing action.

My invention is not to be restricted to the precise details of construction shown since various changes and modifications may be made therein without departing from the scope of the invention or sacrificing the advantages derived from its use.

What I claim is:

1. In a saw holder, in combination, separate clamping barrel members for holding a saw blade therebetween, a clamp having a flexible sleeve portion in which the barrel members are supported in blade engaging relation and for rotary movement, depending tabs on said clamp, a handle presenting arcuate jaw portions for receiving said tabs and means associated with said handle and tabs for uniting the handle, jaw portions and clamp in adjusted gripping relation.

2. In a saw holder, in combination, separate clamping barrel members arranged to grip and hold a saw blade therebetween, a clamp presenting a flexible sleeve portion for receiving said barrel members, depending tabs on said clamp, a handle having a bifurcated end in which said tabs fit, the upper ends of the bifurcation abutting said sleeve portion, and a single means associated with the handle and the tabs for adjustably securing the latter to cause the sleeve to grip the barrel members and in adjusted position relative to said handle.

3. In a saw holder, in combination, clamping barrel members arranged to grip and hold a saw blade therebetween, said barrel members having recessed portions, a blade stiffener supported in said recesses for holding the blade in desired shape, a clamp presenting a sleeve portion and opposed tab sections, a handle presenting a body portion and upper bifurcated terminal ends between the latter of which the said tab portions fit, means passing through the handle and the tab portions for adjustably securing the clamp to the handle, said means causing the tabs to close to tighten the grip of the sleeve about the said barrel members disposed therein, and the inner surfaces of said terminal ends being shaped to engage said clamp sleeve portion.

4. In a saw holder, in combination, separate clamping barrel members arranged to grip and hold between them a saw blade, a blade stiffener channelled to fit closely over the upper edge of the saw blade substantially coextensive therewith and arranged to be gripped and held between the barrel members, a flexible clamp in which said barrel members and stiffener are mounted for rotary adjusting movement, a handle for the clamp, and a single screw means for securing the clamp in adjusted position to the handle and actuating the clamp to grip said barrel members and said stiffener.

5. In a saw holder, in combination, clamping barrel members having recesses formed in the clamping faces thereof, a saw blade, a blade stiffener substantially coextensive with the blade and engaging the upper opposite side edges thereof, a flexible clamp for adjustably supporting said clamping barrel members whereby the stiffener seated in said recesses is clamped with said blade between the barrel members, a handle for the clamp, means for adjustably securing said clamp and handle together, and said handle, flexible clamp and the means for adjustably securing the clamp and handle together cooperating to clamp the barrel members together.

RAYMOND DOW.

REFERENCES CITED

The following references are of record in the file of this patent:

UNITED STATES PATENTS

| Number | Name | Date |
|---|---|---|
| 703,538 | Cartwright | July 1, 1902 |
| 2,307,411 | Leatherman | Jan. 5, 1943 |
| 1,726,241 | Schubert | Aug. 27, 1929 |
| 139,284 | Walker | May 27, 1873 |
| 2,286,530 | Fordon | June 16, 1942 |
| 1,905,482 | Magri | Apr. 25, 1933 |

FOREIGN PATENTS

| Number | Country | Date |
|---|---|---|
| 15,547 | Great Britain | Nov. 29, 1886 |